United States Patent
Saito

[15] 3,649,990

[45] Mar. 21, 1972

[54] WIPER DEVICE FOR THE FRONT WINDOWPANE OF A MOTOR-VEHICLE

[72] Inventor: Shosaku Saito, 2,7 Suruza-cho, Shizuoka Japan

[22] Filed: Jan. 12, 1970

[21] Appl. No.: 2,068

[52] U.S. Cl. ........................................................15/250.22
[51] Int. Cl. ...................................................B60s 1/02
[58] Field of Search ............15/250.22, 250, 250.16, 250.17

[56] References Cited

UNITED STATES PATENTS

| 2,181,066 | 11/1939 | Rau | 15/250.22 X |
| 2,239,754 | 4/1941 | Marti | 15/250.22 X |
| 2,271,225 | 1/1942 | Heffernan | 15/250.22 X |
| 2,634,447 | 4/1953 | Domek et al. | 15/250.22 |
| 2,978,729 | 4/1961 | Pschibul | 15/250.22 X |

FOREIGN PATENTS OR APPLICATIONS

| 834,054 | 3/1952 | Germany | 15/250.22 |
| 1,047,649 | 12/1958 | Germany | 15/250.22 |

*Primary Examiner*—Peter Feldman
*Attorney*—Holman & Stern

[57] ABSTRACT

A wiper device for the windshield of an automobile and similar vehicles in which wiper members adapted to rotate across the windshield in frictional contact with the outer surface thereof are carried by rotary stub shafts rotatably supported by hollow members. Flexible shafts are connected at one end to the rotary shafts for rotating the shafts and gears having shafts are connected to the other ends of the flexible shafts and a drive motor for driving the gears.

9 Claims, 8 Drawing Figures

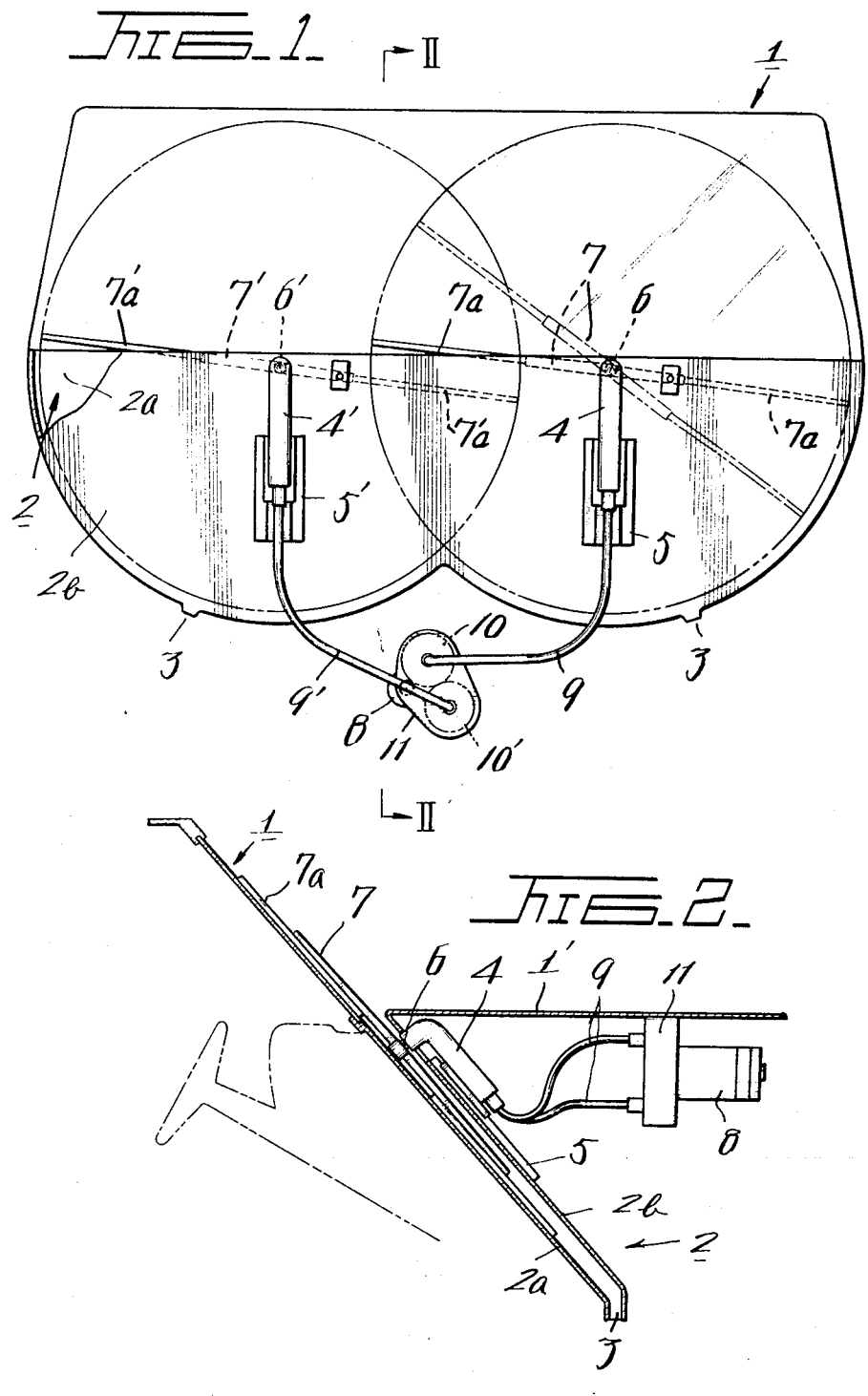

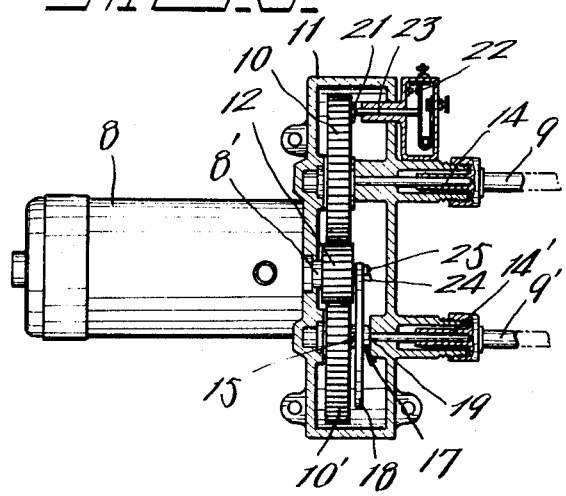
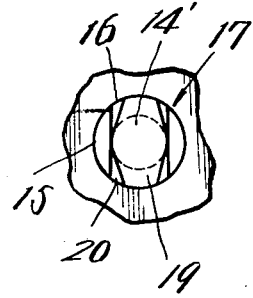
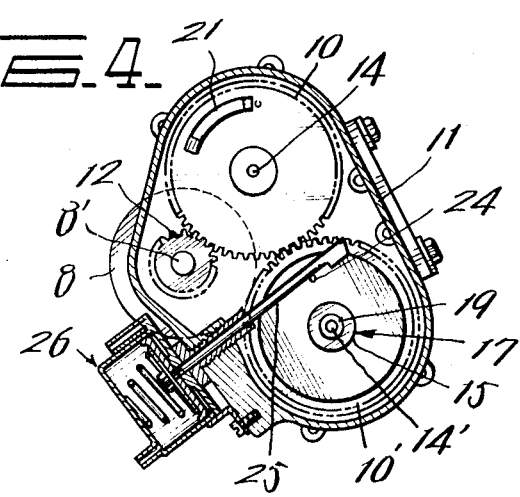
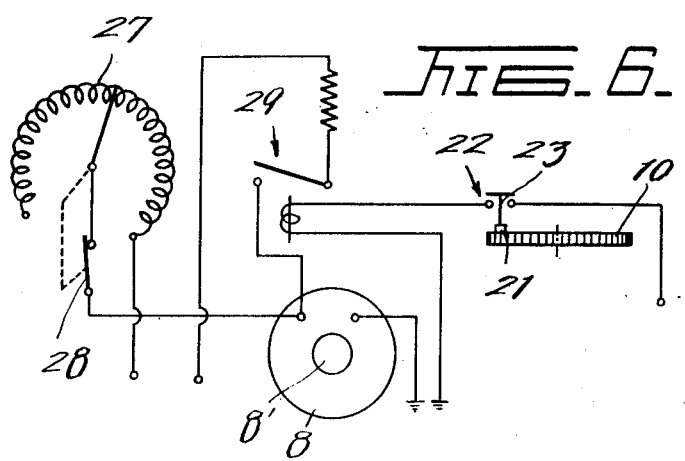

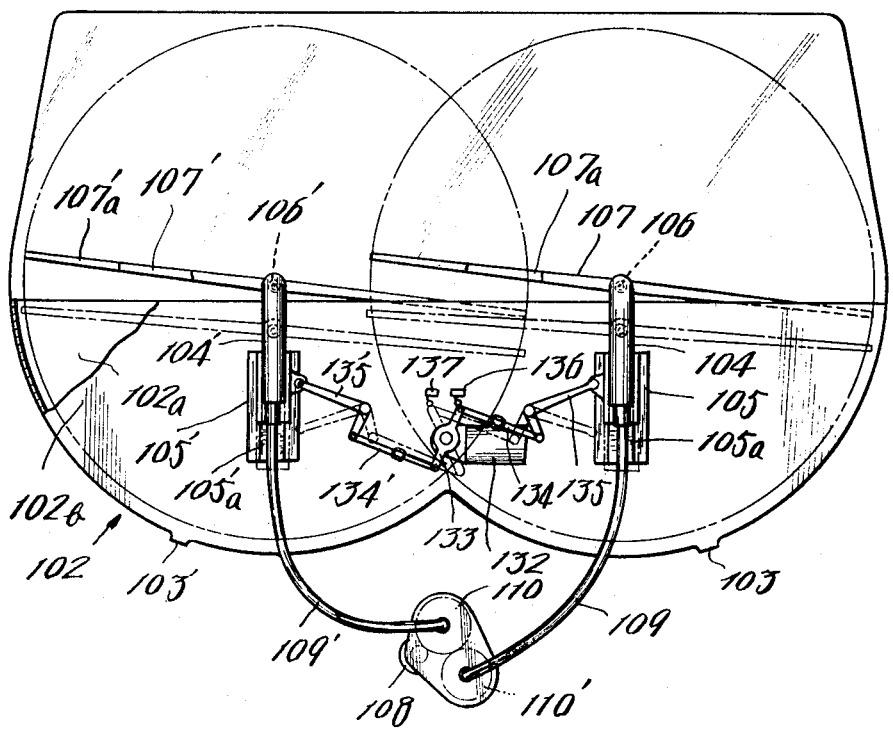

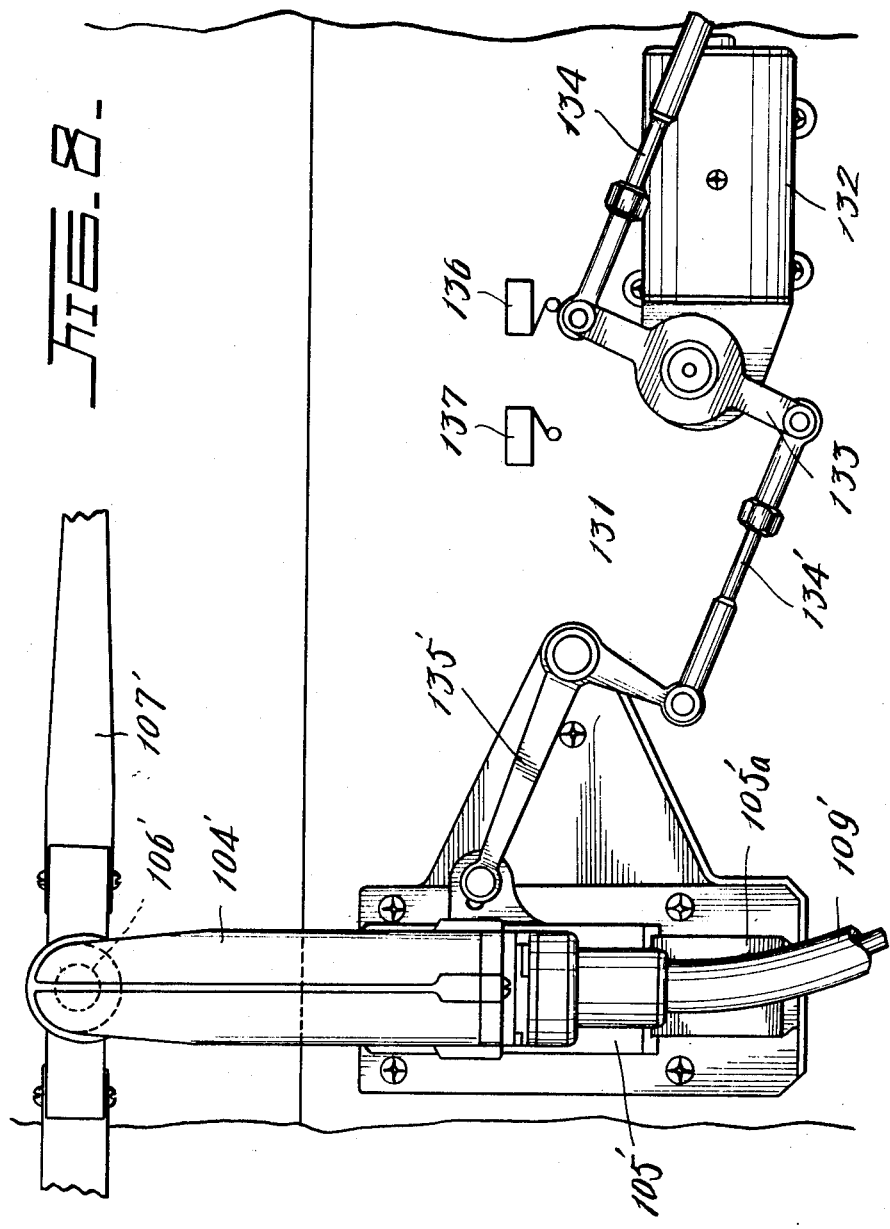

3,649,990

1

WIPER DEVICE FOR THE FRONT WINDOWPANE OF A MOTOR-VEHICLE

BACKGROUND OF THE INVENTION

There has been a great variety of wiper devices for motor-vehicles and other vehicles proposed and practically employed to date. In one type of the conventional wiper devices, wiper members are pivoted at the upper or lower ends and rotate across the windshield of the vehicle in frictional contact with the outer surface thereof defining sectoral loci. In another type of conventional wiper device, the wiper members are pivoted at the upper or lower ends and move left to right and vice versa across the windshield in frictional contact with the outer surface of the windshield defining rectangular loci. However, such conventional wiper devices are objectionable in that the area to be wiped is limited to a relatively narrow range and usually leave a substantial portion of the windshield area unwiped.

SUMMARY OF THE INVENTION

The present invention relates to wiper devices for installation on the windshields of motor-vehicles and other vehicles for wiping the windshields.

The object of the present invention is to provide an improved wiper device of the type described in which wiper members are supported at intermediate points between the opposite ends thereof and adapted to rotate across the windshield in frictional contact with the outer surface thereof defining circle loci so as to wipe a greater area of the windshield than that wiped by conventional wipers which rotate defining sectoral or rectangular loci.

According to one aspect of the present invention, there is provided a wiper device which comprises a water collector fixedly mounted on the front side of the driver's compartment of a vehicle; wiper assembly mounting means fixedly secured to the water collector; wiper assemblies rotatably mounted on the mounting means for rotational movement across the windshield in frictional contact with the outer windshield surface defining circular loci and having operative and inoperative positions; and drive means for driving the wiper assemblies.

According to another aspect of the present invention, there is provided a wiper device comprising a water collector fixedly mounted on the front side of the driver's compartment of a vehicle; wiper assembly mounting means vertically movably mounted on the water collector; wiper assemblies rotatably mounted on the mounting means for rotational movement across the windshield in frictional contact with the outer surface thereof defining circular loci and also for vertical movement with the mounting means, the wiper assemblies having operative and inoperative positions; drive means for rotatably driving the wiper assemblies; and a lifting mechanism for vertically moving the wiper assembly means and wiper assemblies between the operative and inoperative positions.

The above and other objects and advantages of the present invention will be more clearly understood to those skilled in the art from the following description referring to the accompanying drawings in which preferred embodiments of the invention are illustrated.

BRIEF DESCRIPTION OF THE DRAWINGS

FIG. 1 is a front elevational view of a preferred embodiment of windshield wiper device according to the present invention showing the wiper device mounted on the windshield of a motor-vehicle for wiping the outer surface thereof with a portion being cut away;

FIG. 2 is a view substantially taken along the line II——II of FIG. 1 and as seen in the direction of the arrow;

FIG. 3 is a fragmentary side elevational view on an enlarged scale of a drive mechanism for driving a pair of wiper members of the wiper device in timed relation showing a portion thereof in section;

FIG. 4 is a front elevational view of the drive mechanism shown in FIG. 3;

2

FIG. 5 is a fragmentary view on a further enlarged scale of a portion of the drive mechanism of FIGS. 3 and 4;

FIG. 6 is a block diagram of an electric circuit employed in the drive mechanism;

FIG. 7 is a front elevational view of a modified form of wiper device for a motor-vehicle according to the present invention; and FIG. 8 is a fragmentary front elevational view on an enlarged scale of a portion of the modified form of wiper device.

DETAILED DESCRIPTION OF THE INVENTION

In FIGS. 1–5 is illustrated a first embodiment of the present windshield wiper installed in a motor vehicle for wiping the outer surface of a windshield 1. A water collector or sump 2 is provided immediately below the bottom edge of the windshield 1 on the front and outer side of the driver's compartment (not shown) and comprises a rear plate member 2a and a front plate member 2b. The rear plate member 2a lies in the same plane as the windshield 1 and the front plate member 2b is spaced outwardly from and in parallelism with the rear plate member to form an opening therebetween. A pair of drain pipes 3 and 3 are provided at spaced points in the bottom of the water sump 2 in communication with the opening between the rear and front plate members for receiving and discharging water which will run along the windshield 1 into the opening. A pair of hollow shaft wiper holders 4 and 4' are fixedly mounted at spaced points on the external side of the front plate member 2b (the number of the holders 4 may be increased as desired) by means of a corresponding number of seating plates 5 and 5' and the upper end of each of the holders 4, 4' rotatably supports transverse stub shafts 6 and 6' which extend toward and terminate short of the bottom edge of the windshield 1. Wiper members 7 and 7' are fixedly secured in the center to the rotary shafts 6, 6' and the wiper members carry wiper elements 7a, 7'a which resiliently urged against and are to move frictionally across the outer surface of the windshield 1. The wiper elements 7a, 7'a are formed of a suitable elastic material such as for example soft rubber or plastic. Since the wiper elements 7a, 7'a are of such soft and elastic material, even if the windshield 1 has any curvature or curvatures on its outer surface against which the wiper elements are resiliently urged the wiper elements can all the times maintain its frictional contacting relation with the windshield 1 as the wiper elements move thereacross.

An electric drive motor 8 is connected to the rotary shafts 6, 6' by means of a pair of flexible shafts 9 and 9' which are, in turn, connected at one end through gears to the motor and at the other end to the rotary shafts. The motor 8 is preferably of a variable speed type so that the motor can suitably adjust the rotational speed of the rotary shafts 6, 6' and accordingly, of the wiper members 7, 7', depending upon varying rain and snow conditions. A timing gearing generally comprising a pair of meshing gears 10 and 10' is provided for rotationally driving the stub shafts 6, 6' and members 7, 7' in timed relation from the motor 8 through the flexible shafts 9, 9'.

The timing gearing is housed in a gear box 11 which is suitably connected to the motor 8. One of the gears 10 meshes with a drive gear wheel 12 fixedly mounted on an output shaft 8' of the motor and has a shaft 14 to one end of which the flexible shaft 9 is detachably connected, and the other gear 10' which meshes with the mating gear 10 has a shaft 14' to which one end of the other flexible shaft 9' is connected. The gear 10' has an integral boss 15 on one side and the boss is formed with a notch 16 on the outer or free end face. A clutch 17 is mounted on the boss 15 and comprises a follower wheel 18 which has, on the side adjacent to the boss 15, an integral insert piece 19 inserted in the notch 16 leaving a space 20 on its opposite sides with respect to the opposite side walls of the notch 16. The follower wheel 18 is connected to the gear 10' to rotate the gear at an angle of delay over 30° with respect to the gear 10. The shaft 14 of the gear 10 is adapted to impart its rotational movement to the wiper member 7 while the other gear 10' is adapted to impart its rotational movement to the associated wiper member 7'.

As disclosed in FIG. 3, a cam 21 is mounted on the side of the gear 10 remote from the motor 8 for a purpose to be later described. A motor stop switch 22 is mounted a switch box 22' fixedly secured to the gear box 11, and a retractable actuating bar 23 extends from the switch 22 through the switch box 22' into the gear box 11. The arrangement of the cam 21 and retractable bar 23 is so designed that the cam 21 is adapted to engage and push the bar 23 to cause the bar to retract when the wiper members 7 and 7' reach their horizontal or nonoperative position after the wiper members have completed one wiping cycle and the retracted bar 23 opens the stop switch 22 to stop and maintain the wiper members 7 and 7' in the horizontal position.

A pin 24 is provided on the side of the gear 10' remote from the motor 8 and an angle-of-delay-compensating member 25 extends from the outside of the gear box 11 into the gear box and has a shoulder 25' which is adapted to normally engage the pin. The compensating member 25 is driven by a drive means in the form of a fluid cylinder 26 secured to the gear box 11 and the arrangement of the pin 24, member 25 and fluid cylinder 26 is so designed that when the wiper member 7' is rotated, the compensating member 25 is forced to advance until the shoulder 25' disengages from the pin 24 to allow the gear 10' to rotate freely. On the other hand, when the wiper member 7' ceases to rotate, the compensating member 25 is retracted by the fluid cylinder 26 until the shoulder 25' again engages the pin 24 to allow the follower wheel 18 to rotate by the angular distance corresponding to the angle of delay.

The motor 8 further has a governor 27 and an actuating switch 28 which are interconnected to each other in a circuit and the governor is adapted to vary the rotational speed of the motor 8 in a non-stepping manner. The circuit to the motor 8 further includes a relay 29 which is adapted to make and break the power source circuit to the motor 8, and the operation of the relay is subjected to the control of the switches 22 and 28.

The wiper members 7, 7' including their wiper elements 7a, 7'a when they are in the horizontal or nonoperative position and all the parts of the drive mechanism, are housed in the enclosure by a hood 1' of the motor-vehicle.

Both gears 10 and 10' are simultaneously rotated when the motor 8 is energized. Upon rotation of the gears 10 and 10', the wiper member 7 and 7a are immediately rotated from the rotating gear 10 through the flexible shaft 9 and stub shaft 6. However, the other wiper member 7 and element 7'a which is connected through the stub shaft 6', flexible shaft 9' and clutch 17 to the gear 10' are rotated only after the wiper member 7 and element 7a have rotated by 30° because the clutch 17 rotatably connects the wiper member, and element 7'a through the above-mentioned intermediate means to the gear 10' with an angle of delay of 30° with respect to the wiper member 7 and element 7a associated with the gear 10. Thus, although both the wiper assemblies 7, 7a and 7', 7'a move in their loci portions of which intersect each other across the windshield 1 in frictional contact with the latter, the wiper assemblies can rotate without interfering with each other. As the wiper assemblies 7, 7a and 7', 7'a rotate in the manner described above, they can wipe a substantial portion of the area of the windshield 1 leaving only a small portion of the area unwiped at the opposite corners thereof and above the intersecting portions of the movement loci of the wiper assemblies. The rotational speed of the wiper assemblies 7, 7a and 7', 7'a can be varied as desired by varying the rotational speed of the motor 8 and therefore, even in case of a heavy rain or snow fall, or even when the motor-vehicle is driven at high speed, the wiper assemblies can wipe and keep the windshield clean, thus affording the driver a clear field of vision in front and preventing an accident which might otherwise occur due to poor visibility. When the rain or snow ceases to fall and the windshield 1 does not require wiping, the governor 27 reduces the rotational speed of the motor 8 whereupon the cam 21 on the gear 10 pushes the bar 23 to cause the bar to retreat, thus opening the switch 22.

The opening of the switch 22 stops the rotational movement of the motor 8 and the wiper assemblies 7, 7a and 7'a cease to rotate and return to their normal horizontal or inoperative position where they remain until they are rotated. When the wiper assemblies 7, 7a and 7', 7'a are in the normal horizontal position, they are entirely out of the driver's vision. When the motor 8 is deenergized, if the wiper assembly 7', 7'a is stopped and remains in a position above its normal horizontal position because of its angle of delay of 30° with respect to the other wiper assembly 7, 7a, the fluid cylinder 26 is actuated to cause the member 25 to compensate the angle delay. As the delay of the compensating member 25 retracts, the member pulls the pin 24 on the gear 10' to rotate the follower member 18 which in turn rotates the wiper assembly 7', 7'a from the present position to the normal horizontal or inoperative position by the angle of delay with respect to the other wiper assembly 7', 7'a.

FIGS. 7 and 8 show a modified embodiment of wiper device installed on the windshield of a motor-vehicle, and differs from the first embodiment in that the wiper assemblies are housed within the enclosure of the hood of a motor-vehicle when they are not in operation. Accordingly, only portions the embodiment of FIGS. 7 and 8 which differs from FIGS. 1 through 6 will be described in detail as well as the corresponding parts of the first embodiment which are related to the modified embodiment.

A pair of seat plates 105 and 105' are vertically movably mounted below front plate member 102b of water collector 102 at spaced points thereon and have guides 105a and 105'a, respectively disposed therein in the lower portion thereof. Wiper shaft holders 104 and 104' are received in the respectively associated seating plates 105 and 105' for vertical movement together with the seating plates and the upper portion of each of the wiper shaft holders normally projects above the upper end of each seating plate when the wiper assemblies are in the operative position. The upper ends of the wiper holders 104 and 104' rotatably support transverse stub shafts 106 and 106', respectively which in turn support wiper assemblies 107, 107a and 107'a, respectively, in the same manner as previously mentioned. A lifting mechanism which is common to the pair of wiper assemblies and their respectively associated parts is generally indicated 131 in FIG. 8. The lifting mechanism 131, which may be in the form of an electrically operated link type, generally comprises a reduction motor 132 having a rotary shaft 132', a lever 133 mounted in the center on the motor shaft for rotational movement with the latter. Rods 134, 134' are pivoted at one end to the opposite ends of lever and bell cranks 135, 135' which are pivoted at one end to the other ends of the respectively associated rods 134, 134' and at the other end to the respectively associated wiper shaft holders 104, 104', respectively. Alternatively, the lifting mechanism may be in the form of a fluid cylinder having a piston rod operably connected to the wiper shaft holders 104, 104'.

For limiting the upward and downward vertical movement of the wiper shaft holders 104 and 104', limit switches 136 and 137 are provided on the front plate member 102b of the water collector 102 at spaced points thereon. The limit switches 136 and 137 are so positioned with respect to the lifting mechanism 131 and, more particularly, to the wiper shaft holders 104 and 104' that when the wiper holders have been lifted to their uppermost position in their vertical movement stroke or their operative position, and when they have been lowered to their lowermost position or their inoperative position where the wiper holders are concealed within the enclosure of the hood 1, the rotational movement of the motor 132 is stopped. In FIGS. 7 and 8, when the wiper shaft holders 104 and 104' reach the uppermost or operative position, the limit switch 136 engages the arm of the lever 133 which pivotally supports the adjacent end of the rod 134, whereas when the wiper holders reach the lowermost or inoperative position, the limit switch 137 engages the other arm of the lever which pivotally supports the adjacent end of the rod 134'. The lowered or inoperative position of the wiper shaft holders 104, 104' and wiper assemblies 107, 107a and 107'a is indicated by dot and dash lines in FIG. 8.

When the motor 132 is rotated in the direction in which the lever 133 is rotated in the counterclockwise direction, the movement of the lever in such direction pivots the bell cranks 135, 135' downwardly by means of the rods 134, 134' until the wiper members 107, 107' reach the lowermost point in the arm of the lever which pivotally supports the rod 134 engages the limit switch 136 and which the wiper bodies are maintained inoperative so they are out of the driver's vision whereas when the motor 132 is rotated in the opposite direction in which the lever 133 is rotated in the clockwise direction, the movement of the lever in the second direction pivots the bell cranks 135, 135' by means of the rods 134, 134' upwardly until the wiper members reach the uppermost or operative position (the solid line position in FIG. 8) in which the other arm of the lever which pivotally supports the rod 134' engages the limit switch 137 and the wiper members can rotate continuously across the windshield in frictional contact therewith when the motor 108 is energized. Also, in FIGS. 7 and 9, the rotational movement or wiping speed of the wiper assemblies 107, 107a and 107', 107'a can be varied by varying the rotational speed of the motor 108 depending upon varying rain or snow falls and therefore, even in the event of a heavy rain or snow fall when the motor-vehicle is driven at a high speed, the windshield can be kept clean at all times so that the driver has a clear front field of vision. Thus, the present invention can improve safety factor in driving motor-vehicles.

Since the wiper assemblies 107, 107a and 107', 107'a are so arranged that they are rotated only after they have been lifted to the uppermost or operative position, even if the wiper members are formed of members having a relatively short length a substantial portion of the area of the windshield can be perfectly cleaned, leaving only a small portion of the area thereof unwiped at the opposite upper corners and the area above the intersecting sections of the loci of the wiper assemblies which are out of the driver's field of vision. When the wiper assemblies 107, 107a and 107', 107'a are housed in the horizontal position within the water sump 102, the water sump can be made as shallow as possible. The wiper devices of the present invention can be easily and advantageously mounted on motor-vehicles and other vehicles having a small space in the engine compartment and the like.

Although the present invention has been described in its preferred forms with a certain degree of particularly, it is understood that the present disclosure of the preferred forms have been made only by way of example and that numerous changes in the details of construction and arrangement of parts may be resorted to without departing from the spirit and scope of the invention as hereinafter claimed.

What is claimed is:

1. A wiper device for a windshield of a motor-vehicle and other vehicles, comprising a water collector fixedly mounted on the front side of the driver's compartment of the vehicle; at least two wiper assembly mounting means secured to said water collector at spaced apart locations thereon and below the lower edge of the windshield; an elongated wiper assembly rotatably mounted intermediate the ends thereof on each of said mounting means for rotational movement across the windshield in frictional contact with the outer surface thereof defining two circular loci which partially intersect with each other; each wiper assembly having an inoperative position in which the assembly is substantially horizontal and below the lower edge of the windshield; and drive means for imparting rotation to said wiper assemblies, said drive means including means for providing one of said wiper assemblies a predetermined angle of delay with respect to the other wiper assembly and means for stopping the movement of said wiper assemblies in their horizontal position.

2. A wiper device for a windshield of a motor-vehicle and other vehicles, comprising a water collector fixedly mounted on the front side of the driver's compartment of the vehicle and having an opening; a pair of wiper assembly mounting members fixedly secured to said water collector at spaced points thereon; a pair of first and second wiper assemblies each rotatably mounted on each of said mounting members for rotational movement across the windshield in frictional contact with the outer surface thereof defining a pair of circular loci which partially intersect with each other; drive means for driving said pair of wiper assemblies and including a pair of first and second gears, said first gear being directly connected to drive said first wiper assembly and said second gear being indirectly connected to said second wiper assembly through a clutch for providing the second wiper assembly a predetermined angle of delay with respect to the first wiper assembly; and a stop switch mounted on said first gear for stopping the movement of the pair of wipers in their horizontal position.

3. A wiper device for a windshield of a motor vehicle or other vehicles, comprising a water collector fixedly mounted on the front side of the driver's compartment of the vehicle; at least two wiper assembly mounting means vertically movably mounted on said water collector at two spaced apart locations thereon; said mounting means being vertically movable from a position below the lower edge of the windshield to a position substantially coinciding with the lower edge of the windshield; a wiper assembly rotatably mounted on each of said mounting means for rotational movement across the windshield in frictional contact with the outer surface thereof defining circular loci and also for vertical movement with the mounting means, each of said wiper assemblies having an inoperative position in which the assembly is substantially horizontal and below the lower edge of the windshield; drive means for imparting rotation to said wiper assemblies; said drive means including means for providing one of said wiper assemblies a predetermined angle of delay with respect to the other wiper assembly and means for stopping the movement of said wiper assemblies in their horizontal position; and a lifting link mechanism for vertically moving said wiper assembly mounting means and wiper assemblies from their positions below the lower edge of the windshield to their positions substantially coinciding with the lower edge of the windshield.

4. The wiper device as set forth in claim 2, in which said water collector comprises a pair of spaced and parallel plate members having said opening defined therebetween.

5. The wiper device as set forth in claim 2, in which said wiper assembly mounting means comprises a pair of rotary shafts on which said wiper assemblies are mounted for rotational movement therewith; and a pair of hollow shaft holders for rotatably supporting said pair of rotary shafts.

6. The wiper device as set forth in claim 1, in which said wiper assemblies each comprises a wiper member and an integral elastic wiper element.

7. The wiper device as set forth in claim 5, in which said drive means comprises a pair of flexible shafts extending through said hollow shaft holders and each being connected to one end to each rotary shaft for rotatably driving the same; said first and second gears each being connected at one end to the other end to the other end of each flexible shaft for driving the same; and an electric motor connected to the other ends of said gears for driving the same.

8. A wiper device for a windshield of a motor-vehicle or other vehicles, comprising a water collector fixedly mounted on the front side of the driver's compartment of the vehicle; wiper assembly mounting means vertically movably mounted on the water collector; wiper assemblies rotatably mounted on said mounting means for rotational movement across the windshield in frictional contact with the outer surface thereof defining circular loci and also for vertical movement with the mounting means; said wiper assemblied having operative and inoperative positions; drive means for rotatably driving said wiper assemblies; and a lifting link mechanism for vertically moving said wiper assembly mounting means and wiper assemblies between said operative and inoperative positions; and said lifting link mechanism comprising a motor; a lever rockably mounted on said motor; a pair of rods pivoted at one end to the opposite end of said lever; and a pair of bell cranks pivoted at one end to the other end of said rods and at the other end to a pair of vertically movable wiper shaft holders.

9. The wiper device for a motor-vehicle and other vehicles as set forth in claim 2, in which said operative position of the wiper assemblies is the uppermost position and said inoperative position of the wiper assemblies is the lowermost position wherein the assemblies are received in an opening of the water collector.

* * * * *